United States Patent [19]

Wallace

[11] 4,077,101

[45] Mar. 7, 1978

[54] DRIVER FOR HELICAL THREAD INSERTS

[76] Inventor: Robert P. Wallace, Dean's Corner, Rte. 22, Brewster, N.Y. 10509

[21] Appl. No.: 692,587

[22] Filed: Jun. 3, 1976

[51] Int. Cl.² .............................................. B23P 19/04
[52] U.S. Cl. ..................................... 29/240.5; 29/456
[58] Field of Search ................................ 29/456, 240.5

[56] References Cited

U.S. PATENT DOCUMENTS

| | | | |
|---|---|---|---|
| 1,816,282 | 7/1931 | Heyner et al. | 29/456 |
| 2,210,061 | 8/1940 | Caminez | 29/240.5 |
| 2,325,508 | 7/1943 | Haas et al. | 29/240.5 |
| 2,390,545 | 12/1945 | Lang | 29/240.5 |
| 3,093,895 | 6/1963 | Eddy | 29/240.5 |
| 3,348,293 | 10/1967 | Newton et al. | 29/240.5 |

Primary Examiner—Charlie T. Moon

Attorney, Agent, or Firm—Mark T. Basseches; Paula T. Basseches

[57] ABSTRACT

The present invention is directed to an improved driving mandrel for insertion of spiral thread inserts into complementally tapped bores. The mandrel comprises a generally cylindrical structure having a drive tooth at one end for engagement with the tang of an insert, the device being characterized by its being formed of a resilient polymeric material having rigidifying means located at a zone adjacent the drive end, whereby the body portion of the mandrel beyond the zone is subject to limited deflection under torsional and lateral displacing forces. In accordance with a preferred embodiment, the mandrel includes a readily compressible zone in registry with the trailing end of the insert, whereby the insert may be supported against elongation and yet be free to contract as it is driven into the bore, greatly reducing the possibility of cross threading.

16 Claims, 14 Drawing Figures

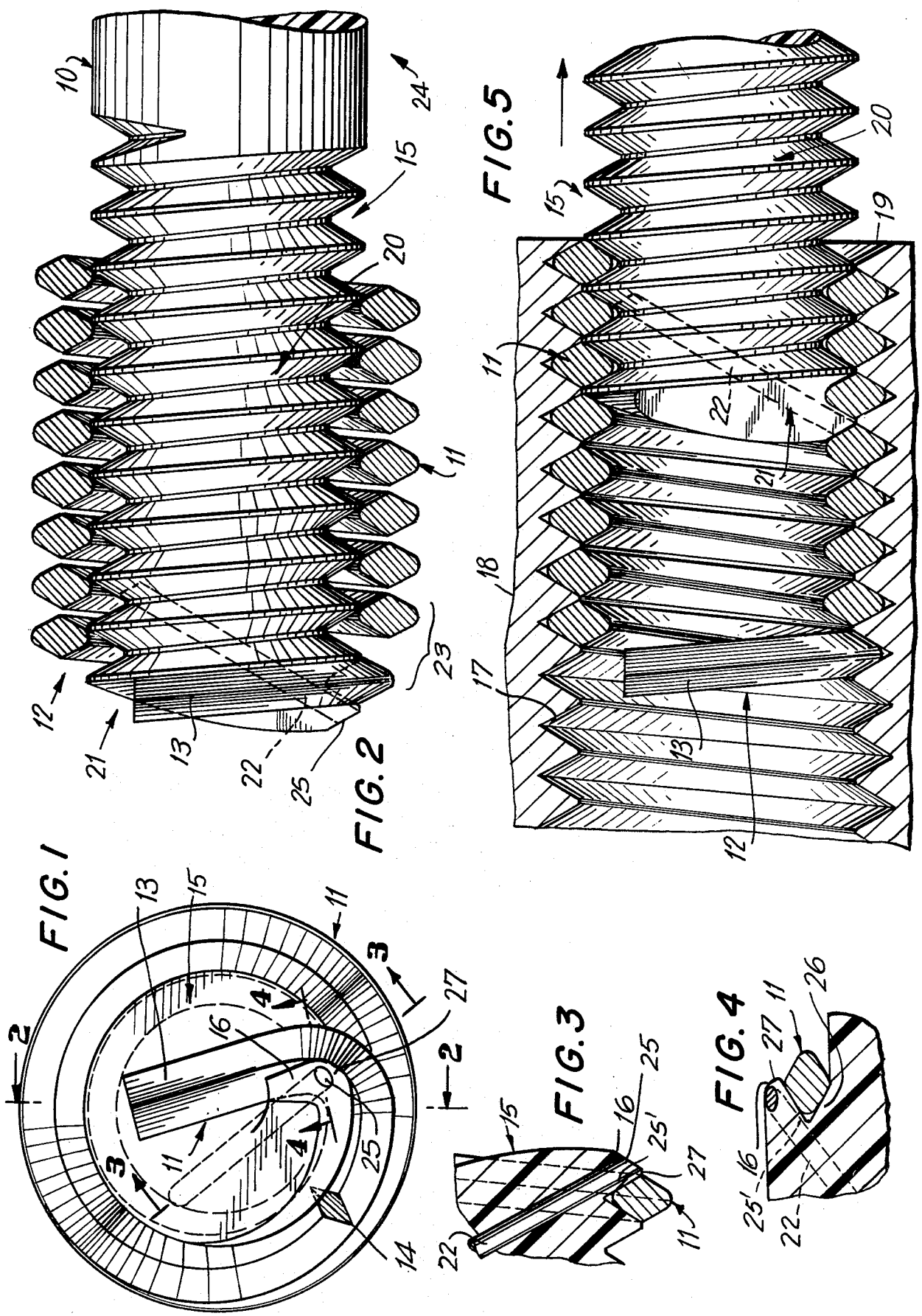

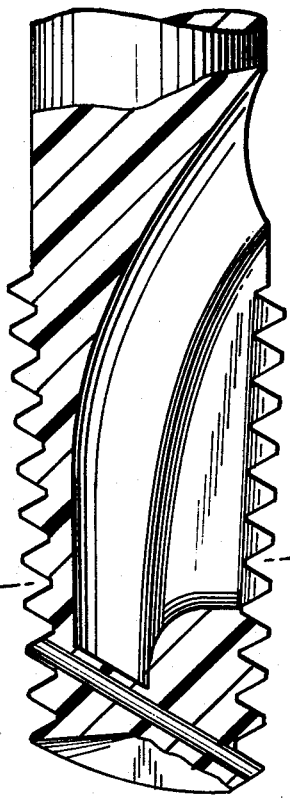
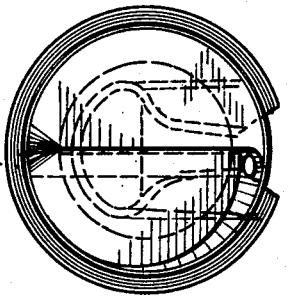
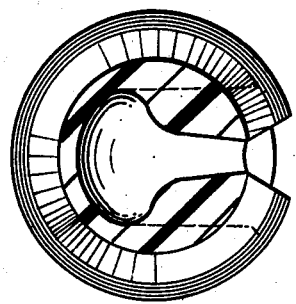
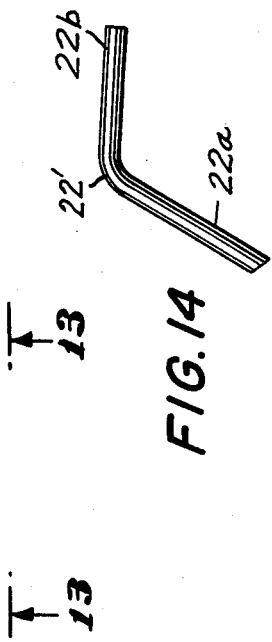
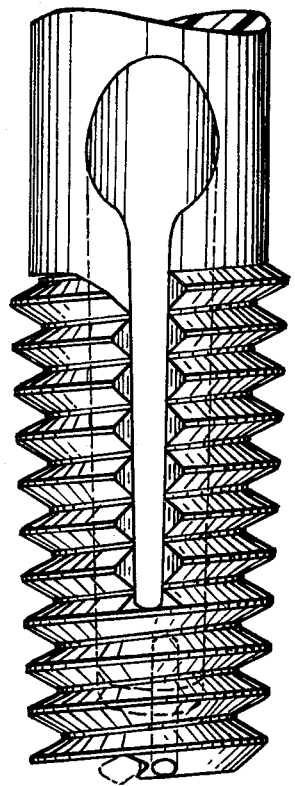

DRIVER FOR HELICAL THREAD INSERTS

BACKGROUND OF THE INVENTION

1. Field of the Invention

The present invention is in the field of spiral thread inserts and more particularly is directed to an improved driving tool for inserting the same.

2. The Prior Art

As is well known, helical thread inserts are becoming increasingly employed as a means for repairing stripped, worn, or damaged threads as well as presenting a hardened stainless steel thread liner in original equipment applications where frequent threading and unthreading are expected. Briefly, where the threads in a bore are stripped or worn, repair is effected by drilling out the bore to remove remnants of the damaged threads, thereafter tapping the drilled out bore and then inserting in the tapped bore a spiral insert, the outer diameter of which is intimately engaged in the threads of the retapped bore, the inner diameter of the spiral insert providing a threaded bolt receiver portion of the same size and pitch as that presented by the original threading of the bore.

In order to assure that the spiral inserts remain in position within the tapped bore, the spiral is, prior to insertion, of a somewhat larger diameter than the bore. Thus, when it is driven into position by rotation in the tapped bore, substantial torque must be asserted on the insert, resulting in its radial inward compression.

The typical installation tool employed to position spiral inserts has comprised an elongate, hardened metal cylinder having a drive end and a torque applying end, examples of such tools being disclosed in U.S. Pat. No. 3,348,293. The torque applying end may include a handle or, where powerized application is contemplated, a drive shank facilitating coupling to a torque transmitting member, such as the chuck of a drill press or air tool.

The drive end of the mandrel includes a drive tooth which engages against a drive tang formed on the insert, to provide torque transfer to the lead end of the insert.

Typically, the outer surface of the mandrel is threaded to permit the insert to be mounted over the mandrel, the diameter of the threads of the mandrel being substantially less than the inside diameter of the spiral, providing clearance for radial compression of the spiral to fit the smaller diameter of the tapped bore.

In the use of mandrels of the type described, a relatively high incidence of cross threading had been observed, cross threading being the condition in which the spiral does not ride in the tapped grooves but, rather, intersects the same. The tendency toward cross threading is greatest with fine thread inserts, and during the initial and terminal stages of insertion of the spiral into the bore.

During the initial stages, there is a substantial tilting tendency, resulting when the lead end of the insert is attempted to be introduced into the lead portion of the tapped thread. Such tilting is most pronounced where the axis of the mandrel is manually rotated rather than being supported in a mechanical device which assures a precise concentricity between the axes of the mandrel and the workpiece. The tendency toward cross threading is increased by the loose fit of the insert on the driving tool, precluding precise positioning of the insert relative to the tapped aperture, the loose fit being mandated to allow for compression of the coil.

The drive tooth, which must be extremely accurately formed, is designed not only to apply a torsional force to the drive tang but also to prevent pitch variations and cross threading of the lead convolutions of the insert. The latter function is provided by a lip portion which overlaps the lead end of the insert, and constitutes the most fragile portion thereof.

Cross threading at the terminal stages of insertion is sometimes observed, especially when the spiral insert is of a relatively thin gauge wire. During the terminal driving stages, the last convolution of the spiral is unsupported by trailing convolutions and, thus, is susceptible to expansion in an axial direction. Frequently, an insert may be properly inserted and, in the terminal stages, the terminal convolution will become separated or develop a pitch angle different from the remainder of the spiral, leading to a condition in which, due to cross threading, it will be impossible to insert a bolt into the applied insert, necessitating removal and replacement of the insert. Cross threading at the trailing end increases the torque and may result in a jamming or wedging of the components, a condition which may result in fracture of the drive tooth.

SUMMARY

The present invention may be summarized as directed to an improved drive mandrel for the application of spiral (helical) thread inserts into tapped bores. In accordance with the invention, the mandrel is formed of a resilient polymeric material. The mandrel is characterized by the portions thereof at the insert engaging end incorporating a rigidifying implant or insert member, one end of which member is disposed in intimate relation to a drive tooth engaging the tang, the body of the rigidifying member extending in a longitudinal direction but displaced from the axis of the mandrel. The drive tooth includes a lip portion outwardly lapping part of the drive tang, and the rigidifying member extends into such lip to prevent deflection of the lip.

The remaining length of the mandrel is preferably left free of rigidifying influences of a magnitude which would preclude twisting or deflection under the torsional stresses encountered in the course of driving the insert into position.

Such construction has been found advantageous in many aspects, namely, the flexibility of the major body portion facilitates coupling of the lead convolutions of the insert with the thread in the bore by permitting a degree of self-compensation. Additionally, the mandrel, by virtue of the resilience of the body portion, is able to cushion the impact where torsion is applied in a sudden manner without proper alignment between the parts, reducing damage to the drive tooth and lip. Unexpectedly, and by reason of this cushion effect, the life of the mandrel is greatly extended.

In accordance with preferred embodiments, the mandrel includes, in spaced relation to the driving portion, a radially inwardly compressible zone calculated to register with the trailing end of the positioned insert.

The external surface of the mandrel, at the compression zone, is threaded, as is the case with typical drive tools. However, unlike the typical drive tool wherein substantial clearances between the threads and insert must be provided to accommodate constriction of the insert, the threaded portion in registry with the trailing end of the insert is sufficiently large in diameter to engage and support the trailing convolutions of the insert. Thus, in the final stages of driving of the insert, the trailing convolutions are supported against axial elongation relative to the remainder of the insert and consequent cross threading. The reduction in diameter of the final convolutions, which is necessary in order to complete insertion of the insert, is accommodated by the ability of the resilient portion of the mandrel to be compressed in a radial inward direction.

It will thus be observed that, unlike mandrels heretofore known in which the fit between the insert and the mandrel is loose to permit inward contraction of the insert, with consequent increased chances of longitudinal elongation, the present mandrel fully supports the trailing convolutions of the insert until they are firmly positioned, eliminating the possibility of cross threading. Moreover, since the insert is rigidly mounted on the mandrel, starting of the thread in the aperture is facilitated.

Accordingly, it is an object of the present invention to provide an improved driving device for positioning spiral inserts in complementally tapped bores.

A further object of the invention is the provision of an improved mandrel of the type described which is formed of polymeric material rigidified adjacent the drive end, whereby starting alignment of the insert with the tapped aperture is facilitated and the likelihood of damage to the tool is reduced.

A further object of the invention is the provision of an improved mandrel of the type described which includes a zone which is subject to inward deflection under radial compression, such zone being disposed in registry with the trailing convolutions of an insert, the thread portions of the external surface of the mandrel in alignment with the compression zone being in intimate relation to the final convolutions of the insert to provide support therefor.

A further object of the invention is the provision of an improved method for driving spiral inserts of the type described.

To attain these objects and such further objects as may appear herein or be hereinafter pointed out, reference is made to the accompanying drawings, forming a part hereof, in which:

FIG. 1 is a plan view of the lead or driving end of a mandrel with a spiral insert positioned thereon;

FIG. 2 is a side sectional view of the mandrel taken on the line 2—2 of FIG. 1;

FIG. 3 is a fragmentary section taken on the line 3—3 of FIG. 1;

FIG. 4 is a fragmentary section taken on the line 4—4 of FIG. 1;

FIG. 5 is a sectional view of an insert positioned in a bore, with the mandrel partially withdrawn;

FIG. 10 is a bottom plan view of the end portion of a mandrel in accordance with a still further embodiment of the invention;

FIG. 11 is a vertical sectional view thereof taken on the line 11—11 of FIG. 10;

FIG. 12 is a vertical section taken on the line 12—12 of FIG. 11;

FIG. 13 is an elevational view taken in the direction of the arrow 13, 13 of FIG. 12;

FIG. 14 is a fragmentary side elevational view of a rigidifying insert member in accordance with a variation of the concept.

Figure 7:
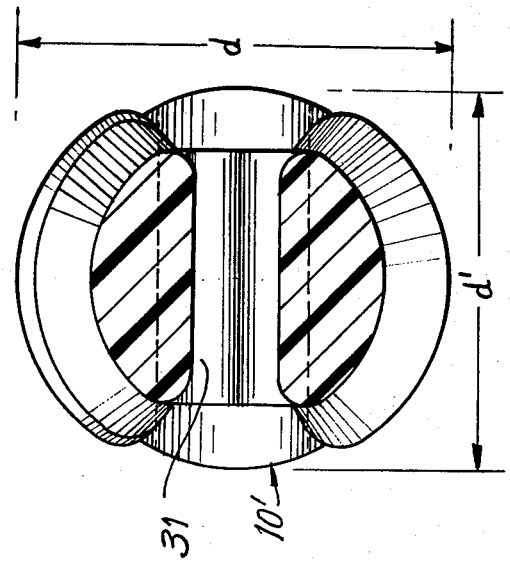
FIG. 7 is a section taken on the line 7—7 of FIG. 6.

Turning now to the drawings, and with particular reference to FIGS. 1 through 4, numeral 10 refers to a mandrel or insert driver device in accordance with the invention, and 11 to a representative spiral insert of the type intended to be inserted by the mandrel, a representative insert being manufactured by The Heli-Coil Products Division, Mite Corporation, under the trademark HELI-COIL.

The insert 11 is comprised of a spiral of wire of resilient stainless steel or other metal having at its lead end 12 an integral drive tang 13 extending in a direction generally normal to the axis of the spiral. A break-off notch 14 is formed in the wire between the main body of the spiral and the drive tang.

In use, the insert 11 is mounted by threading the same over the threaded exterior portion 15 of the mandrel until the drive tang 13 is engaged against drive tooth 16, to be described more particularly hereinafter.

The thus mounted insert is then driven into a complementally tapped bore 17 in the workpiece 18, mounting being effected by advancing the mandrel 10 in such manner that the lead convolution of the insert is positioned adjacent the entry portion 19 of the tapped thread portion 17 defining the periphery of the bore in the workpiece 18.

With the lead portion of the spiral suitably disposed in the entry portion 19 of the tapped bore, the mandrel is rotated in an appropriate direction, depending on the "handing" of the threads, while at the same time an axial force is applied to the mandrel in the direction of the bore. Torsional forces are transmitted from the mandrel to the drive tang 13, whereupon, with continued rotation, the insert is advanced to the position shown in FIG. 5.

It will be noted from a comparison of FIGS. 2 and 5, for instance, that the diameter of the insert in its normal unstressed condition exceeds the diameter of the tapped bore 17 and that after the insert is positioned, the diameter of the insert is reduced. It will be evident that the insert will be mounted under radial compression and, accordingly, there will be virtually no tendency for the insert to become dislodged when a complementally threaded bolt is inserted into position or backed out of position within the mounted insert.

It will be further appreciated that the diameter of the thread portion 15 of the mandrel is sufficiently smaller than that of the interior diameter of the insert to provide the necessary radial clearance, enabling the spiral insert to be compressed in the course of application.

After the spiral is seated, the drive tang 13 is broken at the break-off notch 14 and removed so as not to interfere with the subsequently applied bolt.

The mandrel and the manner of applying the insert as thus far described are essentially conventional.

In the course of application, cross threading of the insert 11 relative to the threaded bore 17 often will occur at two stages, namely, the initial introduction of the insert into the bore and in the final stages of seating of the insert. Additionally, the operation of obtaining a correct interfit of the first turn of the insert with the initial convolution of the tapped bore 17 is difficult to perform accurately, often resulting in stripping of the initial turn of the threaded portion 17 or breakage or premature wear of the drive tooth 16.

In accordance with the invention, these problems, and certain other problems as hereinafter discussed, are largely if not entirely obviated by the mandrel which is the subject of the present invention.

In accordance with the invention, the mandrel 10 is comprised of a resilient polymeric material, by way of example and without limitation, nylon (a long chain polyamide) or an acetal resin sold by DuPont Corporation under the trademark DELRIN. The mandrel incorporates an elongated, generally cylindrical body portion 20 whereby, as a result of the inherent resilience of the plastic and the elongated nature of the body, a certain amount of deflection of the body portion in directions normal to the longitudinal axis of the mandrel is permitted.

In the course of molding the mandrel, there is provided in the driving end 21 thereof a rigidifying member 22. The rigidifying member may be of cylindrical or other configuration and may be comprised of a steel or like metal rod of circular or other cross section. The member 22 is disposed in the lead zone of the driving end in an area running essentially from the tip of the mandrel rearwardly for a distance equal to at least the first few convolutions of an insert in driving position. The member 22 is preferably angularly related to the longitudinal axis of the mandrel.

It will be appreciated that the member 22 will essentially stiffen the zone 23 adjacent the drive end of the mandrel to preclude any substantial deflection or bending within the zone.

A portion 25' adjacent the distal end 25 of the rigidifying member 22 lies immediately adjacent and in intimate spaced relation to the drive shoulder 26 of the drive tooth 16 and, in some instances, the portion 25' may be exposed. It will thus be seen that a driving torque will be transmitted through the body portion of the mandrel to the rigidified zone 23, and that the zone will act as a unit transmitting driving power to the shoulder 26 through the portion 25'. The rigidifying member 22, as shown in FIG. 1, preferably lies at a positive rake angle of about 30° to 50° (see FIG. 1) relative to the direction the mandrel is to be rotated in the driving mode.

The drive tooth 16 includes an overlying lip portion 27 which extends partway over the material of the insert 11 at the junction of the tang and the first convolution. The lip 27 functions to prevent the initial convolutions of the insert from spreading when torque is applied, and the distal end 25 of member 22 lies within the lip 27 positively to prevent the upward deflection of the lip.

The member 22 is inclined upwardly relative to the longitudinal axis of the mandrel at an angle of about 60° offset from the axis, the member thus being offset about 30° from the horizontal. The distal end 25 of the rigidifying member 22 is disposed at or immediately adjacent the upper surface of the lip 27, with the axial center line of the insert 22 lying coincident with the pitch line of the threaded exterior of the mandrel.

The insert is applied in the manner previously described by positioning the lead or driving end 21 of the mandrel at the entrance of the tapped bore 17 and rotating the mandrel while forcing the same inwardly of the tapped bore 17.

In the mandrel in accordance with the invention, by virtue of the resilience of the stem or body portion thereof, there is a strong tendency of the lead portion of the insert to self-compensate or self-align with the axis of the bore 17. Specifically, even if the axis of the body is slightly misaligned as respects the axis of the bore, the stiffened portions at the lead end may retain their concentricity. Thus, with the resilient mandrel of the present invention, the rigidified zone 23 may attain or retain proper angular relationship with the axis of the bore automatically, a feature which is particularly important where the insert is being hand applied.

Normally it would be expected that, due to the greater hardness and wear resistance of metal, a wholly metallic mandrel would prove superior as respects its durability. It has been discovered, however, that the cushioning effects resulting from the use of a mandrel which is resilient provides a unit having long life.

In the description of the ensuing embodiments, like parts have been given like reference numerals.

Figure 6:
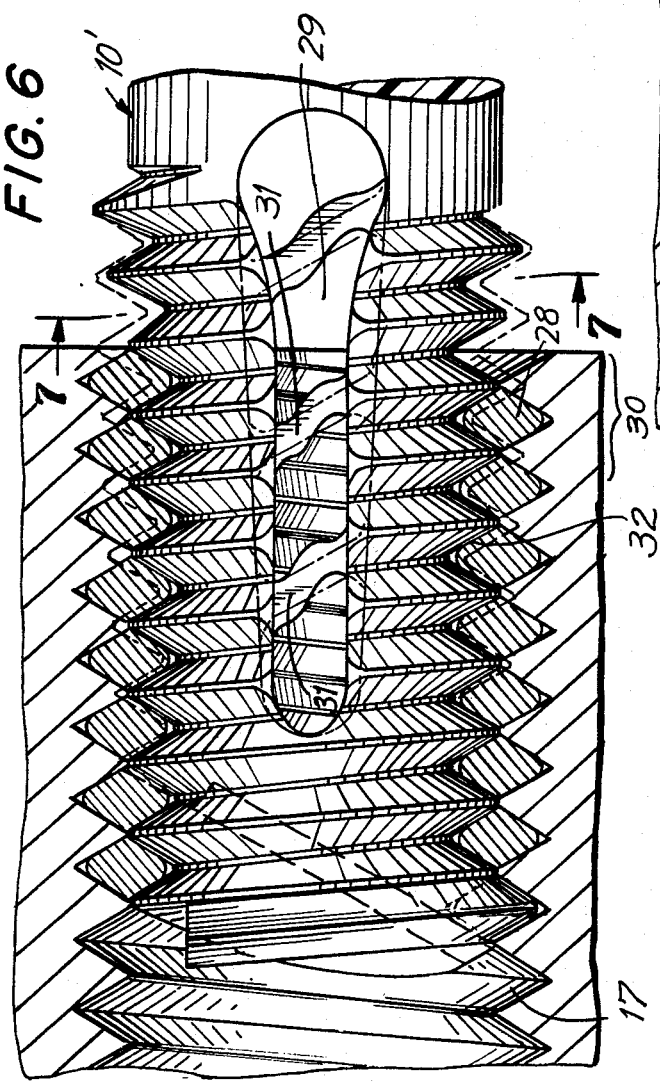
FIG. 6 is a vertical sectional view of a further embodiment of the invention showing a bore, insert, and mandrel in the final stages of positioning of the insert.

Referring now to the modification of FIGS. 6 and 7, there is shown in mandrel 10' having the features heretofore set forth and providing, in addition, superior resistance to cross threading at the trailing convolution 28 of the insert 11.

As earlier alluded to, after the initial convolutions of the insert are correctly threaded into the tapped bore 17, there is little likelihood of the intermediate convolutions becoming cross threaded due to the fact that the reenforcement provided by trailing convolutions prevents axial displacement and pitch variation of such intermediate convolutions. It will be further evident that there is no concomitant support to prevent such axial displacement as respects the final convolution 28.

For this reason, and especially where a very thin gauge wire insert is being applied, it is a common occurrence for the final convolution to spread or extend from the immediately preceding convolutions and cross thread at the entrance of the bore 17. This tendency is accentuated by the fact that the torsional force is being applied at the lead end of the insert.

In order to combat this tendency, the threads in alignment with the trailing end of the insert have been made wider than the preceding threads, providing support for the final convolutions, and the inward contraction of the insert has been accommodated by locating a radially compressible component in this area rather than by providing a large clearance space. While a variety of means for affording such radial compressibility or contractability may be employed, there is illustrated in FIG. 6, by way of example, an axially extending void or recess 29 in zone 30, which zone is in registry with the trailing convolutions of the insert mounted on the mandrel.

A series of stiffener ribs 31 bridges the recess. As a result of the presence of the recess 29, the mandrel is compressible in a transverse or radial direction. In view of the permitted compressibility, the diameter of the threaded portion 32 of the mandrel aligned with the trailing end of the insert may be made sufficiently great intimately to engage and support the final convolutions, e.g. 28, of the insert. Such intimate or close engagement would not be possible if the mandrel were not transversely compressible since, for the insert to enter the bore, a substantial diminution of the diameter of the insert must be effected.

Thus, the provision of a compressible mandrel enables a close fit between mandrel and trailing end of the insert, with consequent resistance to cross threading.

As shown in FIG. 7, the mandrel 10' may be slightly oval in transverse section, being of a greater dimension in one diameter $d$ than in the other diameter $d'$, whereby the contraction of the insert will be accommodated in the direction of the diameter $d$ by compression of the mandrel, and in the direction $d'$ by virtue of the non-interference of the smaller diameter with the insert.

Preferably, the mandrel may taper such that the thread diameters adjacent the lead or drive end of the mandrel are smaller than the diameter of the periphery 32 in the compression zone 30, affording support for the insert toward the trailing end of the insert, where it is needed, without increasing the torsional forces necessary to drive the insert at the beginning or intermediate convolutions thereof.

Figure 9:
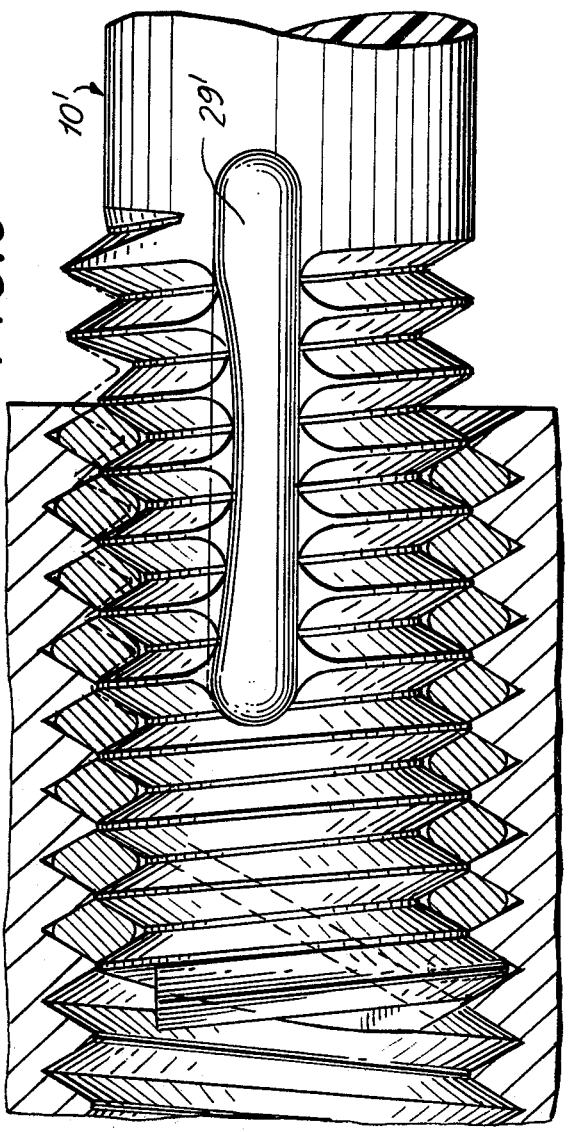
FIG. 9 is a vertical sectional view of the bore, positioned insert, and mandrel of the embodiment of FIG. 8 in the final stages of positioning of the insert.
Figure 8:
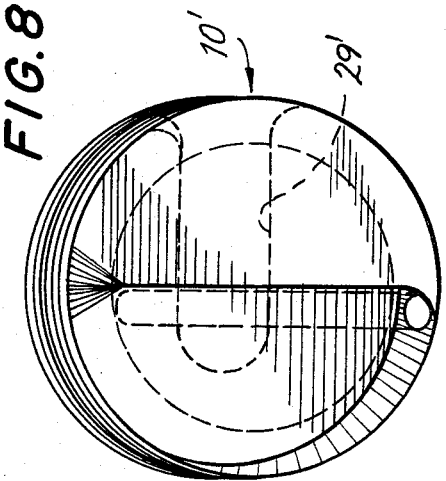
FIG. 8 is a bottom plan view of the lead end of a mandrel in accordance with a further embodiment of the invention.

The embodiment shown in FIGS. 8 and 9 is substantially similar to that of FIGS. 6 and 7 with the exception that the ribs 31 of FIG. 6 have been eliminated. Additionally, whereas the recess portion 29 of FIG. 6 extends through the entire body of the mandrel, the recess 29' of the FIGS. 8 and 9 embodiment extends only partway therethrough.

As best appreciated from FIG. 8, the thread body of the mandrel is tapered, as previously described in connection with the embodiment of FIG. 6. Additionally, the mandrel is not perfectly round, being slightly oval in section, the diameter in the vertical direction, when viewed in the configuration of FIG. 8, being greater than the diameter in the horizontal section.

The embodiments of FIGS. 10 and 11 on the one hand, and FIGS. 12 and 13 on the other, show further possible variations in the configuration on the central recess which affords the desired degree of compressibility of the body portion of the mandrel and increase in diameter size of the external threads on the mandrel in registry with the trailing convolutions of the insert.

All of the embodiments in FIGS. 6 to 13 operate on the same general principle whereby the compressible mandrel offers support for the trailing convolutions of the insert while permitting the contraction required by the reduction in diameter of the insert.

While the principal benefits of the compressible mandrel devices derive from the resistance to spreading of the final convolutions, it will be appreciated that the greater support afforded the trailing portions of the insert tends to prevent longitudinal distortion of the insert at earlier stages as well.

Additionally, the fact that the trailing end of the insert is firmly mounted on the compressible mandrel portion facilitates initiating the threading of the lead end of the insert in the bore since the insert is not subject to wobbling relative to the mandrel and may be more accurately positioned.

While the stiffening inserts 22 have been illustrated as constituting cylindrical metallic members angularly oriented with respect to the longitudinal axis of the mandrel, it will be appreciated that modifications of this configuration may be made without departing from the scope of the present invention.

By way of example and without limitation, the insert 22' shown in FIG. 14 is comprised of two angularly related legs 22a, 22b. When positioned within the mandrel, the leg 22b is oriented parallel with the axis of the mandrel whereas the leg 22a is positioned essentially in the location disclosed in respect of the other embodiments.

For purposes of increased resistance to wear, it may be desirable for the edge portion of the insert actually to be exposed beyond the surface of the plastic and form the drive shoulder of the device, and in practice it has been found that repeated use of a mandrel having an initially embedded insert results in the plastic material being removed to uncover parts of the insert.

From the foregoing it will be seen that the mandrel in accordance with the present invention provides significant advantages as contrasted with driving devices heretofore known for the positioning of spiral inserts in tapped apertures. The mandrels are less expensive to manufacture, facilitate the introduction of the insert into the aperture, and guard against cross threading of the inserts.

It will be evident to those skilled in the art, in the light of the preceding disclosure, that variations in design may be made which nonetheless embody the novel concepts hereinabove disclosed. For instance, it may be feasible to make of separate parts the units which have been illustrated as integrally molded. Accordingly, this invention is to be broadly construed within the scope of the appended claims.

Having thus described the invention and illustrated its use, what is claimed as new and is desired to be secured by Letters Patent is:

1. A cross-thread resistant drive mandrel for inserting spiral inserts having drive tangs into tapped bores which are undersized as respects the diameter of said inserts comprising, in combination, an axially elongated, generally cylindrical resilient polymeric body portion including a drive insert end and a torque applying end, said body portion having a threaded external peripheral portion for supporting said inserts, said threaded portion beginning adjacent said drive end and extending at least partway toward said torque applying end, a drive tooth formed at and projecting axially beyond said drive end of said body portion, said tooth including a generally radially directed drive shoulder positioned to engage the tang of an insert mounted on said mandrel and a lip member extending in leading position relative to said drive shoulder, viewed in the direction of rotation of said body portion in the insert driving mode, said lip member being located axially beyond said drive shoulder and defining with said shoulder a retainer pocket adapted to overlie portions of the drive tang of an insert mounted on said mandrel, a rigid torque transmitter member embedded in the body of said mandrel, said torque transmitter member including portions extending along a longitudinal zone of said mandrel adjacent said drive end, said torque transmitter member including a portion disposed immediately at said drive shoulder and other portions extending into said lip member.

2. A mandrel in accordance with claim 1 wherein said longitudinal zone constitutes a minor portion of the total length of said mandrel between said drive end and said torque applying end.

3. A mandrel in accordance with claim 1 wherein said torque transmitter member comprises a straight rod portion angularly oriented relative to the longitudinal and transverse axes of said mandrel.

4. A mandrel in accordance with claim 1 wherein said end of said torque transmitting member is disposed at a positive rate angle.

5. A mandrel in accordance with claim 1 wherein said longitudinal zone constitutes less than about one third of the length of said mandrel, the remaining portions of said mandrel outside said zone being resiliently deflectible in directions normal to said axis and being subject to limited twisting responsive to torsional stresses of the magnitude encountered in driving said inserts into position.

6. A mandrel in accordance with claim 1 wherein said torque transmitter member comprises a straight rod portion angularly oriented relative to the longitudinal and transverse axes of said mandrel, the axial center line of said rod portion, at the outer terminal end thereof, being substantially coincident with the pitch line of the threaded portion of said mandrel, said rod portion defining with said pitch line an angle of about 60°.

7. A cross-threaded resistant drive mandrel for inserting spiral thread inserts having drive tangs at their lead ends into tapped bores which are undersized relative to the outside diameter of said inserts comprising, in combination, an axially elongated, generally cylindrical, resilient, polymeric body portion including an insert drive end and a torque applying end, drive tooth means formed on said drive end of said mandrel for engaging against and applying a driving torque to the tang of said insert responsive to rotation of said body portion, said tooth including a generally radially directed drive shoulder positioned to engage the tang of an insert mounted on the mandrel, the external periphery of said mandrel adjacent said drive end being formed with a longitudinally extending threaded portion having a pitch corresponding to the pitch of said inserts, whereby said inserts may be threadedly mounted over said drive end until said tang engages said shoulder, the diameter of said periphery of said mandrel, in the area in registry with the trailing end of an insert mounted on said mandrel providing a close fitted connection with the interior of the convolutions of said insert at said trailing end, said mandrel being radially inwardly compressible in said area in registry with said trailing end of said insert.

8. A drive mandrel in accordance with claim 7 and including a recess portion formed on said mandrel radially inwardly of said area in registry with said trailing end of an insert mounted on said mandrel, whereby said radial inward compression of said mandrel is facilitated.

9. A mandrel in accordance with claim 8 wherein said recess is elongated in an axial direction.

10. A mandrel in accordance with claim 9 wherein said recess is spanned by a plurality of transversely extending stiffener ribs.

11. A mandrel in accordance with claim 10 wherein said stiffener ribs are angularly inclined relative to the longitudinal axis of said mandrel.

12. A drive mandrel in accordance with claim 7 and including rigidifying means embedded in the body of said mandrel adjacent said drive end for providing a rigidified zone adjacent said drive end, a portion of said rigidifying means being disposed in intimate spaced relation to said drive shoulder.

13. A drive mandrel in accordance with claim 12 wherein said drive tooth means includes a radially directed drive shoulder positioned to engage the tang of an insert mounted on said mandrel and a lip extending in leading position relative to said drive shoulder, viewed in the direction of rotation of said body portion in the insert driving mode, said lip member being located axially beyond said drive shoulder and defining with said shoulder a retainer pocket adapted to overlie portions of the drive tang of an insert on said mandrel, said rigidifying means extending over a longitudinal section of said mandrel adjacent said drive end and including portions immediately adjacent said drive shoulder and extending into said lip member.

14. A drive mandrel in accordance with claim 7 wherein said external periphery of said mandrel, in the threaded portion thereof, tapers from a lesser diameter adjacent said drive end to a greater diameter in said area in registry with said trailing end of said insert.

15. A cross thread resistant drive device for inserting spiral thread inserts having drive tangs into tapped borew which are undersized relative to the outside diameter of said inserts comprising, in combination, an axially elongated mandrel having a drive end and a torque applying end, an external threaded portion on said mandrel adjacent said drive end for supporting a said insert on said mandrel while limiting axial extension thereof, drive means on said drive end of said mandrel for engaging said tang and transmitting torque to said insert responsive to rotation of said mandrel, said mandrel being characterized by the portion thereof in registry with the trailing end of said insert forming a part of said threaded portion and being radially inwardly compressible and providing an intimate fit with the inner diameter of said insert in the unstressed condition thereof.

16. A device in accordance with claim 15 wherein said mandrel is formed of resilient polymeric material and includes a rigid torque transmitter means embedded in said drive end for rigidifying said drive end.

* * * * *